(12) United States Patent
Schorn et al.

(10) Patent No.: US 7,426,830 B2
(45) Date of Patent: Sep. 23, 2008

(54) SUPERCHARGED INTERNAL COMBUSTION ENGINE

(75) Inventors: Norbert Andreas Schorn, Aachen (DE); Helmut Matthias Kindl, Aachen (DE); Uwe Spaeder, Nordrhein-Westfalen (DE); Rob Stalman, Selfkant (DE)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 11/232,530

(22) Filed: Sep. 22, 2005

(65) Prior Publication Data

US 2006/0059908 A1 Mar. 23, 2006

(30) Foreign Application Priority Data

Sep. 22, 2004 (EP) .................................. 04104587

(51) Int. Cl.
  *F02B 33/44* (2006.01)
  *F02B 37/00* (2006.01)
  *F02B 37/013* (2006.01)
  *F02B 37/007* (2006.01)
  *F02M 25/07* (2006.01)

(52) U.S. Cl. ........................ 60/612; 60/605.2; 123/562

(58) Field of Classification Search .................. 60/612, 60/605.2; 123/562; F02B 37/00, 37/007, F02B 37/013; F02M 25/07
See application file for complete search history.

(56) References Cited

U.S. PATENT DOCUMENTS

| | | | | |
|---|---|---|---|---|
| 4,299,090 A | * | 11/1981 | Deutschmann | 60/612 |
| 4,638,634 A | * | 1/1987 | McLean | 60/612 |
| 4,753,076 A | * | 6/1988 | Deutschmann et al. | 60/612 |
| 5,142,866 A | * | 9/1992 | Yanagihara et al. | 60/612 |
| 6,311,493 B1 | * | 11/2001 | Kurihara et al. | 60/612 |
| 6,360,732 B1 | * | 3/2002 | Bailey et al. | 60/612 |
| 6,484,500 B1 | * | 11/2002 | Coleman et al. | 60/612 |
| 6,918,251 B2 | * | 7/2005 | Yanagisawa et al. | 60/612 |
| 6,920,755 B2 | * | 7/2005 | Hoecker et al. | 60/612 |
| 6,920,756 B2 | * | 7/2005 | Hoecker et al. | 60/612 |
| 6,973,787 B2 | * | 12/2005 | Klingel | 60/612 |
| 2006/0021347 A1 | * | 2/2006 | Sun et al. | 60/612 |
| 2006/0042247 A1 | * | 3/2006 | Haugen | 60/612 |
| 2006/0070381 A1 | * | 4/2006 | Parlow et al. | 60/612 |

FOREIGN PATENT DOCUMENTS

| | | | | |
|---|---|---|---|---|
| DE | 3838149 A1 | * | 5/1990 | 60/612 |
| DE | 1005053977 A1 | * | 5/2007 | |
| EP | 404073 A1 | * | 12/1990 | 123/559.1 |
| JP | 63309726 A | * | 12/1988 | |
| JP | 07293262 A | * | 11/1995 | |

* cited by examiner

*Primary Examiner*—Thai-Ba Trieu
(74) *Attorney, Agent, or Firm*—Julia Voutyras; Allan J. Lippa; Richard M. Sharkansky

(57) ABSTRACT

The invention relates to a supercharged internal combustion engine having at least two cylinder groups of at least one cylinder each, both cylinder groups being equipped with an exhaust pipe, and the two exhaust pipes being in communication with one another, and having two exhaust gas turbochargers, the turbines of which are connected in parallel, with their compressors connected in series, and having an exhaust gas recirculation line which upstream of one of the two turbines branches off from the exhaust pipe assigned to this turbine and opens out into the common intake line. An advantage of this invention is that it provides a supercharged internal combustion engine which overcomes the drawbacks which are known from the prior art and can be used to realize high exhaust gas recirculation rates and high boost pressures, in particular simultaneously, in all the load ranges of the internal combustion engine.

6 Claims, 10 Drawing Sheets

SUPERCHARGED INTERNAL COMBUSTION ENGINE

FIELD OF INVENTION

The invention relates to a supercharger for an internal combustion engine, which allows high exhaust gas recirculation rates and high boost pressures to be realized simultaneously in all load ranges of the internal combustion engine.

BACKGROUND AND SUMMARY OF THE INVENTION

In recent years, there has been a trend toward small, highly charged engines, the supercharging primarily representing a method of increasing power in which the air required for the combustion process in the engine is compressed. These engines are becoming increasingly economically important for the automotive industry.

In general, an exhaust gas turbocharger, in which a compressor and a turbine are arranged on the same shaft, with the hot exhaust gas stream being fed to the turbine and expanded in this turbine, releasing energy, thereby rotating the shaft, is used for the supercharging. The energy which is released to the turbine and ultimately to the shaft by the exhaust gas stream is used to drive the compressor, which is likewise arranged on the shaft. The compressor delivers and compresses the charge air fed to it, with the result that the cylinders are supercharged.

The advantages of the exhaust gas turbocharger, for example compared to mechanical chargers, consists in the fact that no mechanical connection for power transmission between charger and internal combustion engine is present or required. Whereas a mechanical charger takes the energy required to drive it entirely from the internal combustion engine and thereby reduces the power provided and in this way has a detrimental influence on the efficiency, the exhaust gas turbocharger makes use of the exhaust gas energy of the hot exhaust gases.

A typical representative of the small, highly charged engines is an internal combustion engine with exhaust gas turbocharging in which the exhaust gas energy is used to compress the combustion air and which additionally has charge-air cooling, by which the compressed combustion air is cooled before it enters the combustion chamber.

As already stated above, in recent years the use of exhaust gas turbochargers has greatly increased, and there is no foreseeable end to this trend. There are various reasons for this, which will be explained briefly below.

The supercharging serves primarily to increase the power of the internal combustion engine. The air required for the combustion process is compressed, with the result that a greater mass of air can be fed to each cylinder per cycle. This allows the fuel mass and therefore the mean pressure $p_{me}$ to be increased.

Supercharging is a suitable way of increasing the power of an internal combustion engine with unchanged displacement or reducing the displacement for the same power. In any case, the supercharging leads to an increase in the power in relation to the space taken up and a more favorable power-to-mass-ratio. For the same vehicle boundary conditions, it is in this way possible to shift the load collective toward higher loads, where the specific fuel consumption is lower. This is also known as downsizing.

Consequently, supercharging assists with the constant aim in the development of internal combustion engines to minimize fuel consumption, i.e. improve the efficiency of the internal combustion engine, on account of the limited resources in terms of fossil energy carriers, in particular on account of the limited stocks of mineral oil as a raw material for the production of fuels for operation of internal combustion engines.

A further fundamental objective is to reduce the pollutant emission. Supercharging of the internal combustion engine may likewise be a useful tool in achieving this object. This is because if the supercharging is suitably configured, it is possible to achieve benefits in efficiency and exhaust gas emission. For example, by suitable supercharging, for example in a diesel engine, it is possible to reduce the levels of nitrogen oxide emissions without any loss of efficiency. At the same time, it is possible to have a favorable influence on the hydrocarbon emissions. The emissions of carbon dioxide, which are directly linked to fuel consumption, likewise decrease as the fuel consumption drops. Therefore, the supercharging is likewise suitable for reducing the pollutant emissions. To comply with future statutory limits for pollutant emissions, however, further measures are also required, which will be dealt with in more detail below, since they play a significant role in the context of the present invention. Firstly, however, the main problems with designing the exhaust gas turbocharger which also have to be taken into account in all other measures will be outlined.

The design of the exhaust gas turbocharger, in which a fundamental aim is to significantly increase power in all the engine speed ranges, presents difficulties. According to the prior art, however, a considerable drop in torque is observed if the engine speed drops below a certain level. This effect is undesirable, since the driver expects a corresponding level of torque to that achieved by an engine of the same maximum power which is not supercharged even in the lower engine speed range. The turbo-lag, as it is known, at low engine speeds therefore counts as one of the most serious drawbacks of exhaust gas turbocharging.

This drop in torque will be understandable if it is taken into account that the boost pressure ratio is dependent on the turbine pressure ratio. If, for example in the case of a diesel engine, the engine speed is reduced, this leads to a smaller mass flow of exhaust gas and therefore to a lower turbine pressure ratio. Consequently, the boost pressure ratio likewise decreases toward lower engine speeds, which equates to a drop in the torque.

In principle, the drop in the boost pressure can be counteracted by reducing the size of the turbine cross section and the associated increase in the turbine pressure ratio, but this leads to drawbacks at high engine speeds.

In practice, the correlations described often mean that the smallest possible exhaust gas turbocharger, i.e. an exhaust gas turbocharger with the smallest possible turbine cross section, is used. This ultimately only counteracts the drop in torque to a small extent, and the drop in torque is shifted further toward lower engine speeds. Moreover, there are limits on this procedure, i.e., that of reducing the turbine cross section, since the desired supercharging and increase in power is to be possible without restriction and to the desired extent even at high engine speeds.

According to the prior art, various measures have been used to attempt to improve the torque characteristic of a supercharged internal combustion engine.

One example is a small design of the turbine cross section with simultaneous exhaust gas blow-off, it being possible for the exhaust gas blow-off to be controlled by means of boost pressure or by means of exhaust gas pressure. A turbine of this type is also referred to as a waste gate turbine. If the exhaust gas mass flow exceeds a critical level, part of the exhaust gas flow is made to bypass the turbine by means of a bypass line as part of what is known as the exhaust gas blow-off. However, as has already been mentioned above, this procedure has the drawback that the supercharging performance is inadequate at higher engine speeds.

In principle, it is also possible to use a small design of the turbine cross section together with charge-air blow-off; this variant is seldom used, on account of the energy drawbacks of charge-air blow-off, i.e. the deterioration in the effective efficiency, and the compressors which are present may reach their delivery limit, so that the desired power can no longer be provided.

In diesel engines, a small design of the turbine cross section with simultaneous limiting of the boost pressure may be useful at high engine speeds by reducing the fuel mass. However, this does not fully exploit the options for increasing the power by means of exhaust gas turbocharging.

However, the exhaust gas turbocharger can also be designed with a large turbine cross section in a way which is adapted for high engine speeds. In this case, the suction system is then configured in such a manner that dynamic supercharging occurs as a result of shaft processes at low engine speeds. Drawbacks in this case include the high construction costs and the inertia in the event of changes in engine speed.

Furthermore, the torque characteristic of a supercharged internal combustion engine can be improved by compound supercharging. In this case, a plurality of turbochargers connected in parallel with correspondingly small turbine cross sections are connected up as the load increases.

Multiple turbochargers are useful for improving the torque characteristic even when they are configured in the same way as in an internal combustion engine of the generic type. For this purpose, the cylinders of the internal combustion engine are divided into two groups of cylinders which are each equipped with an exhaust pipe. The two turbines are connected in parallel, the first turbine of the first exhaust gas turbocharger being arranged in the exhaust pipe of the first cylinder group and the second turbine of the second exhaust gas turbocharger being arranged in the exhaust pipe of the second cylinder group. Consequently, the turbines are connected in parallel. The two compressors, by contrast, are connected in series, with the first compressor of the first exhaust gas turbocharger arranged in the common intake line, which is used to supply the internal combustion engine with fresh air or fresh mix, and the second compressor of the second exhaust gas turbocharger arranged in the common intake line downstream of the first compressor.

The exhaust gas turbochargers arranged in this way enable the turbines which are operated in parallel to be designed for smaller exhaust gas flows and in this way to have an advantageous influence on the compressor characteristic diagram. The effective compressor characteristic diagram is widened on account of the series connection, i.e., the multi-stage compression. In particular, it becomes possible to shift the pumping limit to smaller compressor flows, with the result that high boost pressure ratios can be achieved even at low compressor flows, which significantly improves the torque characteristic in the lower part-load range.

Exhaust gas turbochargers of smaller dimensions in general and compressors or turbines of smaller dimensions in particular, however, also offer further benefits, on account of their lower mass and their lower mass moment of inertia.

The response of an internal combustion engine which has been supercharged in this manner is significantly improved. The reason for this is that smaller turbines or smaller compressors are less inert than larger turbines or larger compressors, since the rotor can be accelerated and decelerated more quickly. In particular, the second exhaust gas turbocharger, the compressor of which can be made smaller on account of the precompression of the combustion air, has a significantly lower mass moment of inertia.

This effect also has benefits with regard to the particulate emissions, since during acceleration the required increase in the mass of air fed to the cylinders only takes place with a delay with respect to the increased quantity of fuel, on account of the inertia of the rotors.

Turbines of smaller dimensions are also less thermally inert, on account of their lower mass. The hot exhaust gas stream has to flow through the turbines on the way to the exhaust gas aftertreatment systems, where, in particular during the warming-up phase, it releases heat to the turbines, lowering the exhaust gas temperature, so that the heating of the turbines contributes to the catalytic converters arranged in the exhaust section reaching their light-off temperature at a later time.

The series-connected compressors used in a two-stage compression are responsible for providing sufficiently high boost pressures, with the first compressor forming the low-pressure stage and the second compressor forming the high-pressure stage.

As has already been mentioned above, in addition to the supercharging, further measures are required in order to comply with future limits on pollutant emissions. One of the focal points of development work is to reduce nitrogen oxide emissions, which are highly relevant in particular to diesel engines. Since the formation of nitrogen oxides requires not only an excess of air but also high temperatures, one concept for lowering the nitrogen oxide emissions consists in developing combustion processes or methods with lower combustion temperatures.

In this context, exhaust gas recirculation, i.e. the recirculation of combustion gases from the exhaust pipe into the intake pipe, is a useful way of significantly lowering the nitrogen oxide emissions with an increasing exhaust gas recirculation rate. The exhaust gas recirculation rate $x_{EGR}$ is determined as follows:

$$x_{EGR} = m_{EGR}/(m_{EGR} + m_{fresh\ air})$$

where $m_{EGR}$ is the mass of recirculated exhaust gas and $m_{fresh\ air}$ is the combustion air or fresh air supplied (and if appropriate passed through a compressor and compressed).

Exhaust gas recirculation is also suitable for reducing the emissions of unburnt hydrocarbons in the part-load range.

To achieve a significant drop in the nitrogen oxide emissions, it is necessary to use high exhaust gas recirculation rates, which may be of the order of magnitude of $x_{EGR} \approx 60\%$ to 70%.

However, this results in a conflict when operating an internal combustion engine with exhaust gas turbocharging and simultaneous use of exhaust gas recirculation, since the recirculated exhaust gas is removed from the exhaust pipe upstream of the turbine and is no longer available to drive the turbine. This conflict can easily be illustrated on the basis of a single-stage supercharged internal combustion engine with an exhaust gas turbocharger.

If the exhaust gas recirculation rate rises, the remaining exhaust gas stream fed to the turbine decreases at the same time. The lower exhaust gas mass flow through the turbine leads to a lower turbine pressure ratio. As the turbine pressure ratio decreases, so too does the boost pressure ratio, which equates to a lower compressor mass flow. In addition to the decreasing boost pressure, additional problems may arise with regard to the pumping limit of the compressor when operating the compressor.

The effects described, i.e. the increase in the exhaust gas recirculation and the resulting simultaneous decrease in the boost pressure or compressor flow lead to a richer fresh cylinder charge, i.e. to less fresh air or oxygen in the combustion chamber. This leads to increased formation of particulates, in particular during acceleration, since on account of the inertia of the rotor of the exhaust gas turbocharger, as has been mentioned above, the quantity of fuel is often increased more quickly than the fresh air fed to the cylinders.

For this reason, there is a need for supercharging concepts which—in particular in the part-load range—ensure sufficiently high boost pressures combined, at the same time, with high exhaust gas recirculation rates. The part-load range is highly relevant in particular on account of the statutory exhaust gas tests which are prescribed for determining the pollutant emissions. In principle, however, high boost pressures and high exhaust gas recirculation rates are desirable under all operating conditions.

At this point, it should be noted that the terms "low engine speeds" and "high engine speeds" in the context of the present invention are to be understood as meaning that the entire engine speed range which is passed through when undertaking the statutory tests for determining the pollutant emissions is subsumed under the term "low engine speeds".

The conflict which has been outlined between exhaust gas recirculation and supercharging is exacerbated by the fact that the recirculation of exhaust gas from the exhaust pipe into the intake pipe requires a pressure difference, i.e. a pressure drop, from the exhaust gas side to the intake side. Moreover, a high pressure drop is required to achieve the necessary high exhaust gas recirculation rates. This objective requires a low boost pressure or a boost pressure which is lower than the exhaust gas back pressure in the exhaust pipe used for exhaust gas recirculation, which runs contrary to the requirement for a high boost pressure which was imposed above.

The conflicts which have been outlined in connection with the simultaneous use of exhaust gas turbochargers and exhaust gas recirculation systems cannot be resolved in the prior art.

In view of this background, the object of the present invention is to provide a supercharged internal combustion engine which overcomes the drawbacks which are known from the prior art and in particular allows high exhaust gas recirculation rates and high boost pressures to be realized simultaneously in all load ranges of the internal combustion engine.

A further object of the present invention is to provide a method for operating a supercharged internal combustion engine of the above type.

The first object is achieved by a supercharged internal combustion engine having at least two cylinders, which are configured in such a way that they form two groups of in each case at least one cylinder, both cylinder groups in each case being equipped with an exhaust pipe, and the two exhaust pipes being in communication with one another, and having two exhaust gas turbochargers, the turbines of which are connected in parallel by virtue of a first turbine of a first exhaust gas turbocharger being arranged in the exhaust pipe of the first cylinder group and a second turbine of a second exhaust gas turbocharger being arranged in the exhaust pipe of the second cylinder group, with their compressors connected in series, by virtue of a first compressor of the first exhaust gas turbocharger being arranged in a common intake line, which is used to supply the internal combustion engine with fresh air or fresh mix, and a second compressor of the second exhaust gas turbocharger being arranged downstream of the first compressor in this common intake line, and having an exhaust gas recirculation which comprises a line which upstream of one of the two turbines branches off from the exhaust pipe assigned to this turbine and opens out into the common intake line, wherein means which can be used to control the level of the two exhaust gas mass flows passed through the turbines are provided both in the first exhaust pipe and in the second exhaust pipe.

The internal combustion engine according to the invention is equipped with two turbines which are connected in parallel and are arranged in two exhaust pipes and two compressors which are connected in series and are arranged in a common intake line.

Embodiments in which the first compressor is designed to be larger than the second compressor are advantageous since in this configuration of the internal combustion engine the first compressor within the two-stage compression forms the low-pressure stage, whereas the second compressor compresses the air which has already been precompressed and therefore represents the high-pressure stage.

According to the invention, in both exhaust pipes there are means which can be used to control the two exhaust gas streams which are passed through the two turbines. This results in a wide range of options for controlling the hot exhaust gases, i.e., dividing them between the two turbines. On account of the fact that the two exhaust pipes are connected to one another, it is possible for the entire exhaust gas stream to be passed both completely through the first turbine and completely through the second turbine. In principle, it is also possible to divide the hot exhaust gases between the two turbines, in particular asymmetrically, so that a larger exhaust gas stream can be applied to one turbine and a smaller exhaust gas stream can be applied to the other turbine.

As a result, a high boost pressure and a high exhaust gas recirculation rate can be realized at all the operating points of the internal combustion engine. Unlike in conventional supercharging concepts, there is no need to accept a compromise when designing the exhaust gas turbocharger in order to realize more or less satisfactory supercharging in all the engine speed ranges.

Embodiments of the internal combustion engine in which the first turbine is designed to be larger than the second turbine are particularly advantageous.

At low engine speeds or with small quantities of exhaust gas, the means which are provided in the exhaust pipes are then controlled in such a manner that the main part of the exhaust gas is passed through the second, smaller turbine. This allows the second turbine to be designed for small quantities of exhaust gas or small exhaust gas streams, and therefore allows the supercharging to be optimized in the lower and medium part-load ranges. In this context, the exhaust gas stream through the first, large turbine should preferably never be completely suppressed, since the rotors of the turbine are equipped with sliding-contact bearings and a certain rotational speed is required to enable the hydrodynamic lubricating oil film of the sliding-contact bearing to be built up and maintained. In this way, liquid friction in the sliding-contact bearing is ensured under all operating conditions, which is favorable with regard to the wear and service life or functioning of the turbine.

If the exhaust gas stream is passed mainly through the small turbine, in order to generate high boost pressures in the lower and medium part-load ranges, a sufficiently high exhaust gas back pressure is simultaneously generated in the exhaust pipes as a result, ensuring that it is possible to realize high EGR rates.

At high engine speeds or with large quantities of exhaust gas, the means which are provided in the exhaust pipes are then controlled in such a manner that the main part of the exhaust gas is passed through the first, larger turbine. This allows the first turbine to be designed for large quantities of exhaust gas or large exhaust gas streams and therefore allows the supercharging to be optimized in the upper part-load range and near to full load. In this context, for the reasons which have already been mentioned above, the exhaust gas stream through the second, small turbine should preferably never be suppressed altogether.

A sufficiently high exhaust gas back pressure in the exhaust pipes is in this case likewise ensured, with the result that it is possible to realize high EGR rates in the upper part-load range and near to full load as well.

On account of the fact that the two exhaust pipes are in communication with one another, and consequently the same exhaust gas back pressure is present in all the exhaust pipes, it is only necessary to provide one line for exhaust gas recirculation, which branches off from one of the two exhaust pipes upstream of the means for controlling the exhaust gas streams and opens out into the common intake line upstream of the compressors.

The conflict between a high exhaust gas recirculation rate and high boost pressure under all operating conditions of the internal combustion engine, which is intractable according to the prior art, can be resolved in this way. Whereas under operating conditions with large quantities of hot exhaust gas it is predominantly the first exhaust gas turbocharger which is used, with smaller quantities of exhaust gas, it is possible, by suitable control of the means provided, to shift the focal point of the supercharging to the smaller exhaust gas turbocharger and for the exhaust gas stream to be fed substantially to the second, smaller turbine via the second exhaust pipe.

This achieves the first object on which the invention is based, namely that of providing a supercharged internal combustion engine which overcomes the drawbacks which are known from the prior art and in particular allows high exhaust gas recirculation rates and high boost pressures to be realized simultaneously in all the load ranges of the internal combustion engine.

Embodiments of the internal combustion engine in which the means for controlling the exhaust gas mass flow in the first exhaust pipe and/or the means for controlling the exhaust gas mass flow in the second exhaust pipe is a shut-off element, preferably a valve, are advantageous.

The shut-off element is used to vary, preferably continuously, the cross section of flow of the first exhaust pipe and/or the second exhaust pipe, a reduction in the cross section of flow of the exhaust pipe leading to a reduction in the exhaust gas mass flow through the corresponding turbine. On the other hand, increasing the cross section of flow opens up the path through the corresponding turbine and increases the exhaust gas mass flow passed through this turbine. In principle, the shut-off element is provided downstream of the point where the line for exhaust gas recirculation branches off. In particular turbines with a variable geometry are suitable as means for controlling the exhaust gas mass flows for continuous variation of the cross sections of flow.

However, embodiments of the internal combustion engine in which the first or second exhaust pipe is either completely closed or completely opened by the shut-off elements are also of relevance in practice. This enables the internal combustion engine according to the invention to a certain extent to be switched to and fro between two configurations. In this case, the entire exhaust gas stream is passed either through the first, large turbine or through the second, small turbine. If the supercharging is configured appropriately, it is in this way possible to pass the statutory test for determining the pollutant emissions without having to switch over the engine, with the entire exhaust gas stream being passed through the second, small turbine.

If the shut-off element used is a throttle valve, leakage flows can never be entirely avoided even when the throttle valve is completely closed, and consequently at least a small exhaust gas stream flows through the turbines under all operating conditions.

Embodiments of the internal combustion engine in which the shut-off element can be controlled electrically, hydraulically, pneumatically, mechanically or magnetically, preferably by means of engine control, are advantageous.

Embodiments of the internal combustion engine in which the shut-off element for controlling the exhaust gas mass flow is arranged in the exhaust pipe upstream of the turbine, are advantageous, so that the setting of the exhaust gas mass flow takes place before, i.e. upstream of, the turbine.

Embodiments of the internal combustion engine in which the first turbine has a variable turbine geometry are advantageous. A variable turbine geometry increases the flexibility of the supercharging. It allows continuously variable adaptation of the turbine geometry to the particular operating point of the internal combustion engine or to the exhaust gas mass flow. Unlike when using a turbine with a fixed geometry, there is no need to accept a compromise in the design of the turbine in order to realize more or less satisfactory supercharging in all the engine speed ranges. In particular, there is no need for the charge-air blow-off, which is disadvantageous in energy terms, or even for exhaust gas blow-off, as is realized in waste gate turbines.

Embodiments of the internal combustion engine in which the first turbine forms the means for controlling the exhaust gas mass flow in the first exhaust pipe, it being possible to reduce the exhaust gas mass flow passed through the first turbine by adjusting the turbine in the direction of a reduction in cross section, are advantageous. In this embodiment, the variable geometry is utilized to increase the flow resistance of the turbine and to control the exhaust gas mass flow flowing through the first turbine. As has already been mentioned above, a turbine with a variable geometry is particularly suitable for continuously variable adjustment of the cross sections of flow of the exhaust pipe.

Additional components, in particular a separate shut-off element, are not required if the turbine of the first exhaust gas turbocharger which is already present is used to control the quantity of exhaust gas. The separate shut-off element also eliminates the need for separate control of this element and the associated control unit.

However, embodiments of the internal combustion engine in which the first turbine has a fixed, invariable turbine geometry are also advantageous. In this case, unlike in the above-described turbine with a variable geometry (VTG), in principle there is no need for control. Therefore, this embodiment overall has in particular cost benefits.

Embodiments of the internal combustion engine in which the first turbine is designed as a waste gate turbine are also advantageous. What are known as waste gate turbines have a bypass line which bypasses the turbine for the purpose of exhaust gas blow-off. A turbine of this type can therefore be deliberately designed for small exhaust gas streams, which significantly improves the quality of the supercharging in the part-load range. As the exhaust gas stream increases, a larger proportion of the exhaust gas is made to bypass the turbine via the bypass line. A shut-off element is provided in the bypass line for controlling the exhaust gas blow-off. A waste gate turbine is less expensive than a turbine with a variable geometry. Moreover, control is simpler and likewise less expensive than when using a variable turbine geometry.

Embodiments of the internal combustion engine in which the first compressor has a variable compressor geometry are advantageous. As has already been stated in connection with the VTG turbine, a variable geometry increases the quality and flexibility of the supercharging on account of the possibility of continuously variably adapting the geometry to the current operating point of the internal combustion engine.

A variable compressor geometry (VCG) has proven advantageous in particular if only a very small exhaust gas mass flow is passed through the first turbine, since by adjusting the blades it is possible to shift the pumping limit of the compressor in the compressor characteristic diagram toward small compressor flows, thereby preventing the compressor from working beyond the pumping limit.

However, the variable compressor geometry of the first compressor offers advantages in particular in operating situations in which the exhaust gas flows predominantly or completely through the second, smaller turbine and therefore the second, smaller compressor generates the boost pressure required virtually on its own or completely. In these cases, the first compressor merely represents a flow resistance to the fresh air which is taken in by the second compressor. A variable compressor geometry then allows the throttling of the intake line to be relieved by increasing the cross section of flow of the first compressor.

This embodiment is advantageous in particular if the turbine of the first exhaust gas turbocharger has a variable turbine geometry and the compressor geometry is continuously adapted to the turbine geometry.

Embodiments of the internal combustion engine in which the first compressor has a fixed, invariable compressor geometry are advantageous. Compressors with a fixed geometry have cost benefits for the same reasons as turbines with a fixed geometry, namely on account of the simpler design.

Embodiments of the internal combustion engine in which the first compressor is equipped with a first bypass line which branches off from the common intake line downstream of the first compressor, are advantageous. This first bypass line can open out into the common intake line again upstream of the first compressor. A shut-off element is provided in the first bypass line for controlling the quantity of fresh air which is blown off.

Embodiments of the internal combustion engine in which a charge-air cooler is arranged in the common intake line downstream of the compressors, are advantageous. The charge-air cooler lowers the air temperature and thereby increases the density of the air, with the result that the cooler also contributes to better filling of the combustion chamber with air, i.e. to a greater mass of air.

Embodiments of the internal combustion engine in which a second charge-air cooler is arranged in the common intake line between the compressors are advantageous. The combustion air which has been precompressed in the first compressor and is heated during the precompression is in this way cooled before it enters the second compressor, which contributes to improved cylinder filling and therefore further improves the quality of the supercharging.

Embodiments of the internal combustion engine in which the line for exhaust gas recirculation opens out into the common intake line downstream of the charge-air coolers are advantageous. In this way, the exhaust gas stream is not passed through the charge-air coolers, and consequently these coolers cannot become contaminated by deposits of pollutants contained in the exhaust gas stream, in particular carbon particulates and oil.

Embodiments of the internal combustion engine in which an additional cooler is provided in the line for exhaust gas recirculation are advantageous. This additional cooler lowers the temperature in the hot exhaust gas stream and thereby increases the density of the exhaust gases. The temperature of the fresh cylinder charge which is established when the fresh air is mixed with the recirculated exhaust gases is as a result reduced further, and consequently the additional cooler also contributes to better filling of the combustion chamber with fresh mix.

Embodiments of the internal combustion engine in which a shut-off element is provided in the line for exhaust gas recirculation are advantageous. This shut-off element is used to control the exhaust gas recirculation rate. Unlike the means which are used to control the exhaust gas mass flows and thereby influence the exhaust gas back pressure, and consequently influence the EGR rate indirectly, this shut-off element can be used to control the exhaust gas recirculation directly.

The following text describes the preferred designs of the turbine and of the compressor of the second exhaust gas turbocharger. The advantages of the individual designs, namely of the variable geometry, of the fixed geometry and of the waste gate design, have already been explained extensively in connection with the first exhaust gas turbocharger or the first turbine and the first compressor, and consequently reference is made at this point to the corresponding statements, in order to avoid repetition.

Embodiments of the internal combustion engine in which the second turbine has a variable turbine geometry are advantageous. This in particular increases the quality and flexibility of the supercharging. The geometry can be adapted to the exhaust gas mass flow through adjustment of the rotor blades.

Embodiments of the internal combustion engine in which the second turbine forms the means for controlling the exhaust gas mass flow in the second exhaust pipe, it being possible to reduce the exhaust gas mass flow passed through the second turbine by adjusting the turbine in the direction of a reduction in cross section, are advantageous.

Embodiments of the internal combustion engine in which the second turbine has a fixed, invariable turbine geometry are advantageous. This allows an inexpensive supercharging concept.

Embodiments of the internal combustion engine in which the second turbine is designed as a waste gate turbine are advantageous. This allows an inexpensive supercharging concept and at the same time allows the turbine to be designed for small exhaust gas mass flows, i.e., for the part-load range, which is of interest in particular with a view to the tests which are of relevance to determining the pollutant emissions.

Embodiments of the internal combustion engine in which the second compressor has a variable compressor geometry are advantageous. As has already been mentioned above, the variable geometry offers advantages in particular with regard to the pumping limit of the compressor, by shifting this pumping limit. It is possible to generate high boost pressures even at a low fresh air mass flow. In situations in which the second turbine is making no or scarcely any contribution to the compression, the second compressor represents a flow resistance on the way to the cylinders of the internal combustion engine for the fresh air which has been sucked in and compressed by the first compressor. A variable compressor geometry, by increasing the cross section of flow, allows the throttling of the intake line to be relieved.

Embodiments of the internal combustion engine in which the second compressor has a fixed, invariable compressor geometry are advantageous. In this context, cost benefits and simplification of the engine control of the internal combustion engine as a whole are to the fore.

Embodiments of the internal combustion engine in which the second compressor is equipped with a second bypass line which branches off from the common intake line downstream of the second compressor, are advantageous. A shut-off element can be provided in the second bypass line for controlling the quantity of fresh air which is blown off. The bypass line proves advantageous for the situation in which the exhaust gas is passed predominantly or completely through the second turbine and the second compressor performs virtually the entire compressor work, since the compressor may reach its pumping limit, in which case the bypass line helps to avoid pumping.

Embodiments of the internal combustion engine in which the second bypass line opens out into the common intake line downstream of the first compressor or upstream of the second compressor, are particularly advantageous, with a shut-off element preferably being provided in the second bypass line.

This embodiment is particularly advantageous at high engine speeds or with large quantities of exhaust gas when the main part of the exhaust gas is passed through the first, larger turbine. Under these operating conditions, the second, smaller compressor is scarcely operating or is not operating at all, so that the first compressor has to deliver the fresh air through the second compressor, which is disadvantageous from an energy perspective, since the second compressor represents a flow resistance to the fresh air which has been compressed in the first compressor on its way to the cylinders. This inevitably leads to a drop in the boost pressure generated by means of the first compressor.

This can be avoided by means of the advantageous embodiment in question as a result of the second bypass line being opened by opening the shut-off element and the first compressor delivering the air past the second compressor, bypassing the second compressor. Although some of the fresh air may pass into the second compressor, in general the fresh air flow takes the line with the lowest flow resistance, which is formed by the bypass line when the shut-off element is fully open.

For this reason, however, embodiments of the internal combustion engine in which a shut-off element is provided in the common intake line upstream of the second compressor before the point where the second bypass line opens out, are particularly advantageous. As a result, when the shut-off element is closed, the fresh air flow which comes out of the first compressor is inevitably diverted into the bypass line, and is prevented from being delivered into the second compressor at all.

Furthermore, embodiments of the internal combustion engine in which a shut-off element is provided in the common intake line downstream of the second compressor and before the point where the second bypass line branches off, are advantageous is this context in order, by closing this shut-off element, to prevent the charge air from flowing back into the second compressor.

At this point, it should be noted that the second bypass line, together with the shut-off element which is provided upstream of the second compressor and before the point where the second bypass line opens out into the common intake line, can likewise be used to operate the two compressors in parallel.

Embodiments of the internal combustion engine in which the second compressor can be connected to atmosphere by means of an additional line are advantageous.

This embodiment is particularly advantageous at low engine speeds or with small quantities of exhaust gas, when the main part of the exhaust gas is passed through the second, smaller turbine. Under these operating conditions, the first, larger compressor is scarcely operating or is not operating at all, with the result that the second compressor has to pass, i.e. suck, the fresh air through the first compressor, which is disadvantageous from an energy perspective, since the first compressor represents a flow resistance or a throttling point for the fresh air which has been taken in on its way to the second compressor. This causes a drop in the pressure of the air which has been taken in. Moreover, the second compressor, as it takes in the fresh air, extracts oil from the first compressor, which is disadvantageous in particular with regard to pollutant emissions, and should be avoided.

This can be avoided by means of the advantageous embodiment in question as a result of the second compressor being equipped with an additional line, by which this compressor can take in fresh air from the atmosphere, bypassing the first compressor. In this case, it is preferable for a shut-off element, which can be used to interrupt the connection to atmosphere, to be provided in this additional line.

Embodiments of the internal combustion engine in which a shut-off element is provided in the common intake line between the two compressors, are advantageous in this context. The shut-off element is used to completely suppress the flow of fresh air through the first compressor while the second compressor is taking in fresh air from the atmosphere via the additional line.

The second partial object on which the invention is based is achieved by a method for operating a supercharged internal combustion engine, wherein the first turbine is designed to be larger than the second turbine, the first compressor is designed to be larger than the second compressor, and at low engine speeds or with small quantities of exhaust gas, the means provided in the first exhaust pipe and in the second exhaust pipe are controlled in such a manner that the main part of the exhaust gas is passed through the second turbine, i.e. the exhaust gas mass flow passed through the second turbine is greater than the exhaust gas mass flow passed through the first turbine, and at high engine speeds or with large quantities of exhaust gas, the means provided in the first exhaust pipe and in the second exhaust pipe are controlled in such a way that the main part of the exhaust gas is passed through the first turbine, i.e., the exhaust gas mass flow passed through the first turbine is greater than the exhaust gas mass flow passed through the second turbine.

The statements which have been made in connection with the internal combustion engine according to the invention also apply to the method according to the invention. Designing the exhaust gas turbochargers in the manner which has been described and controlling the exhaust gas streams as a function of the engine speed and/or as a function of the quantity of hot exhaust gases makes it possible to realize high EGR rates and, at the same time, high boost pressures under all operating conditions of the internal combustion engine.

Although the two turbines are arranged symmetrically in the two exhaust pipes, they are designed differently, in order to ensure optimum supercharging throughout the entire engine characteristic diagram. Whereas the second turbine is designed for small exhaust gas mass flows, the first turbine is designed for larger exhaust gas mass flows.

Embodiments of the method in which the second compressor is equipped with an additional line, by which this second compressor is connected to atmosphere at low engine speeds, a shut-off element being provided in the additional line for opening and closing this line, are advantageous.

Embodiments of the method in which a shut-off element is provided in the common intake line between the two compressors, which shut-off element is closed when the second compressor is connected to atmosphere by means of the additional line, are advantageous.

As has already been stated above, it is thus possible to prevent the second compressor from having to take in the fresh air through the first compressor at low engine speeds or with small exhaust gas mass flows when the first compressor is providing little if any delivery.

Embodiments of the method in which the second compressor is equipped with a second bypass line, which branches off from the common intake line downstream of the second compressor and opens out into the common intake line downstream of the first compressor and upstream of the second compressor, a shut-off element, which is fully open at high engine speeds or with large quantities of exhaust gas, being provided in this second bypass line, are advantageous.

Embodiments of the method in which a shut-off element, which is fully closed at high engine speeds or with large quantities of exhaust gas, is provided in the common intake line upstream of the second compressor before the point where the second bypass line opens out, are advantageous.

The two method variants which have just been mentioned allow the second compressor to be bypassed, which offers advantages if the second compressor is providing little if any delivery at high engine speeds or with large exhaust gas flows, and therefore merely represents a flow resistance with respect to the fresh air coming out of the first compressor.

Embodiments of the method in which the first turbine is equipped with a variable turbine geometry and the turbine cross section of the first turbine is reduced at low engine speeds or with small quantities of exhaust gas by adjusting the variable turbine geometry, are advantageous.

This increases the flow resistance of the first turbine, with the result that the main part of the hot exhaust gases is passed through the second, smaller turbine, which is designed for these small exhaust gas mass flows and can therefore generate high boost pressures under these operating conditions. Moreover, this ensures a high exhaust gas back pressure in the exhaust pipes, so that high EGR rates can also be realized at the same time.

Embodiments of the method in which the second turbine is equipped with a variable turbine geometry, and the turbine cross section of the second turbine is reduced at high engine speeds or with large quantities of exhaust gas by adjusting the variable turbine geometry, are advantageous.

This increases the flow resistance of the second turbine, with the result that the main part of the hot exhaust gases is passed through the first, larger turbine, which is designed for these large exhaust gas mass flows and can therefore generate high boost pressures under these operating conditions. A high exhaust gas back pressure in the exhaust pipes and therefore high EGR rates are also ensured.

Embodiments of the method in which a shut-off element, preferably a valve, which at low engine speeds or with small quantities of exhaust gas is controlled in such a manner that the main part of the exhaust gas is passed through the second turbine, i.e. the exhaust gas mass flow passed through the second turbine is greater than the exhaust gas mass flow passed through the first turbine, and at high engine speeds or with large quantities of exhaust gas is controlled in such a manner that the main part of the exhaust gas is passed through the first turbine, i.e., the exhaust gas mass flow passed through the first turbine is greater than the exhaust gas mass flow passed through the second turbine, is used as means for controlling the exhaust gas mass flow in the first exhaust pipe and/or as means for controlling the exhaust gas mass flow in the second exhaust pipe, are advantageous.

The above advantages and other advantages, and features of the present invention will be readily apparent from the following detailed description of the preferred embodiments when taken in connection with the accompanying drawings, and from the claims.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1:
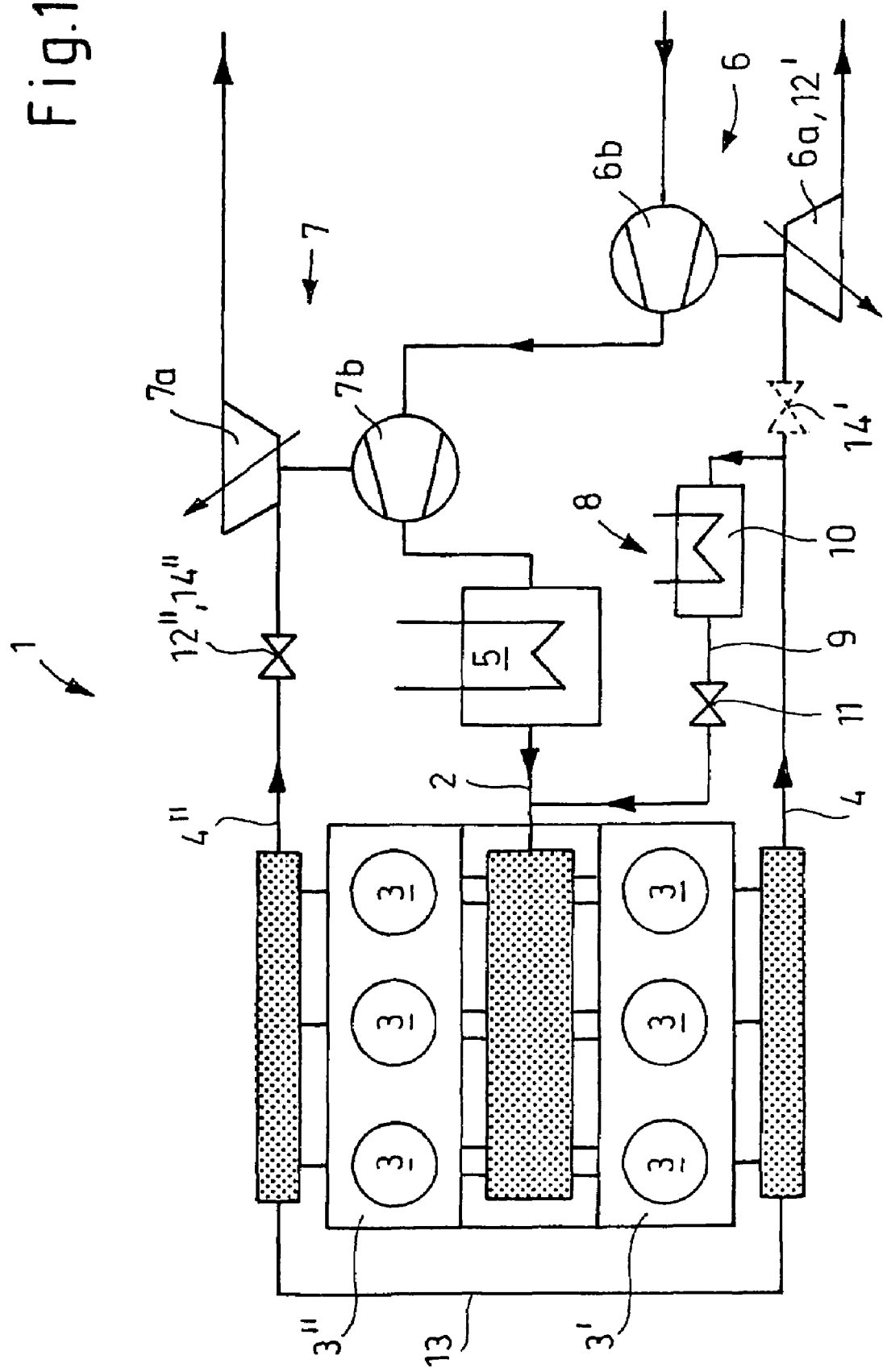
FIG. 1 diagrammatically depicts a first embodiment of the internal combustion engine, FIG. 2 diagrammatically depicts a second embodiment of the internal combustion engine, FIG. 3 diagrammatically depicts a third embodiment of the internal combustion engine, FIG. 4 diagrammatically depicts a fourth embodiment of the internal combustion engine, FIG. 5 diagrammatically depicts a fifth embodiment of the internal combustion engine, FIG. 6 diagrammatically depicts a sixth embodiment of the internal combustion engine, FIG. 7 diagrammatically depicts a seventh embodiment of the internal combustion engine, FIG. 8 diagrammatically depicts an eighth embodiment of the internal combustion engine, FIG. 9 diagrammatically depicts a ninth embodiment of the internal combustion engine, and FIG. 10 diagrammatically depicts a tenth embodiment of the internal combustion engine.
Figure 2:
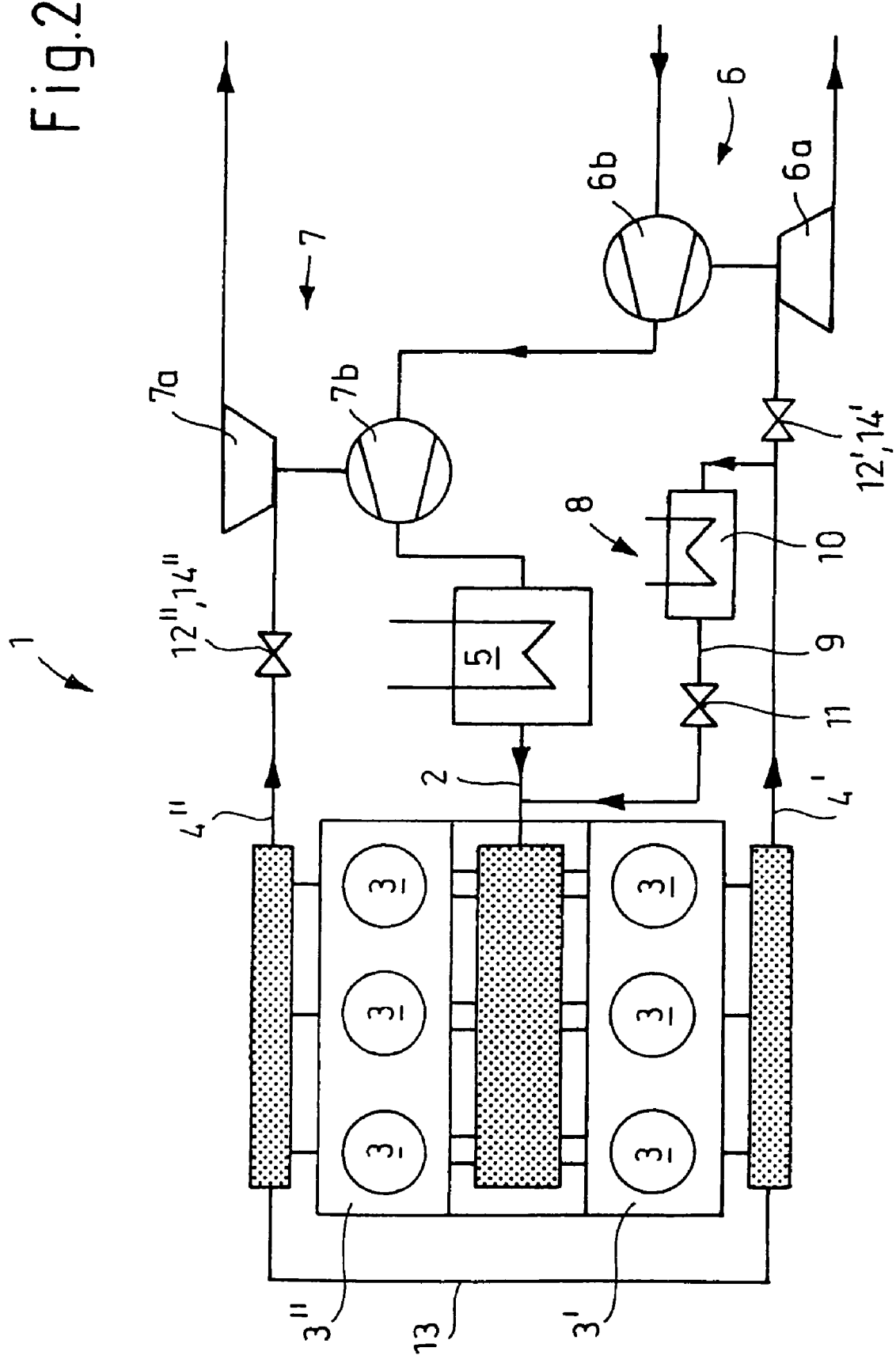
Figure 3:
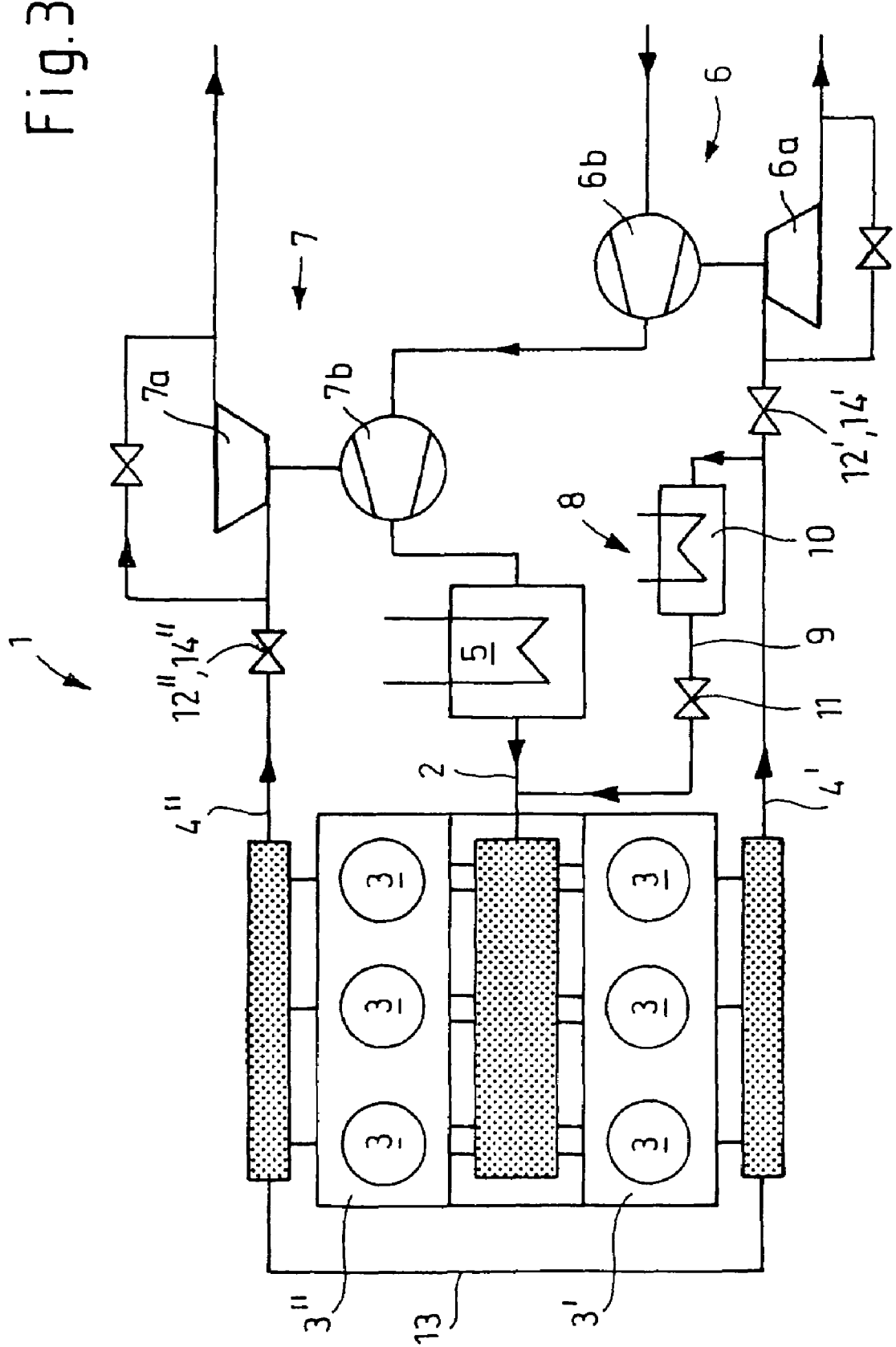
Figure 4:
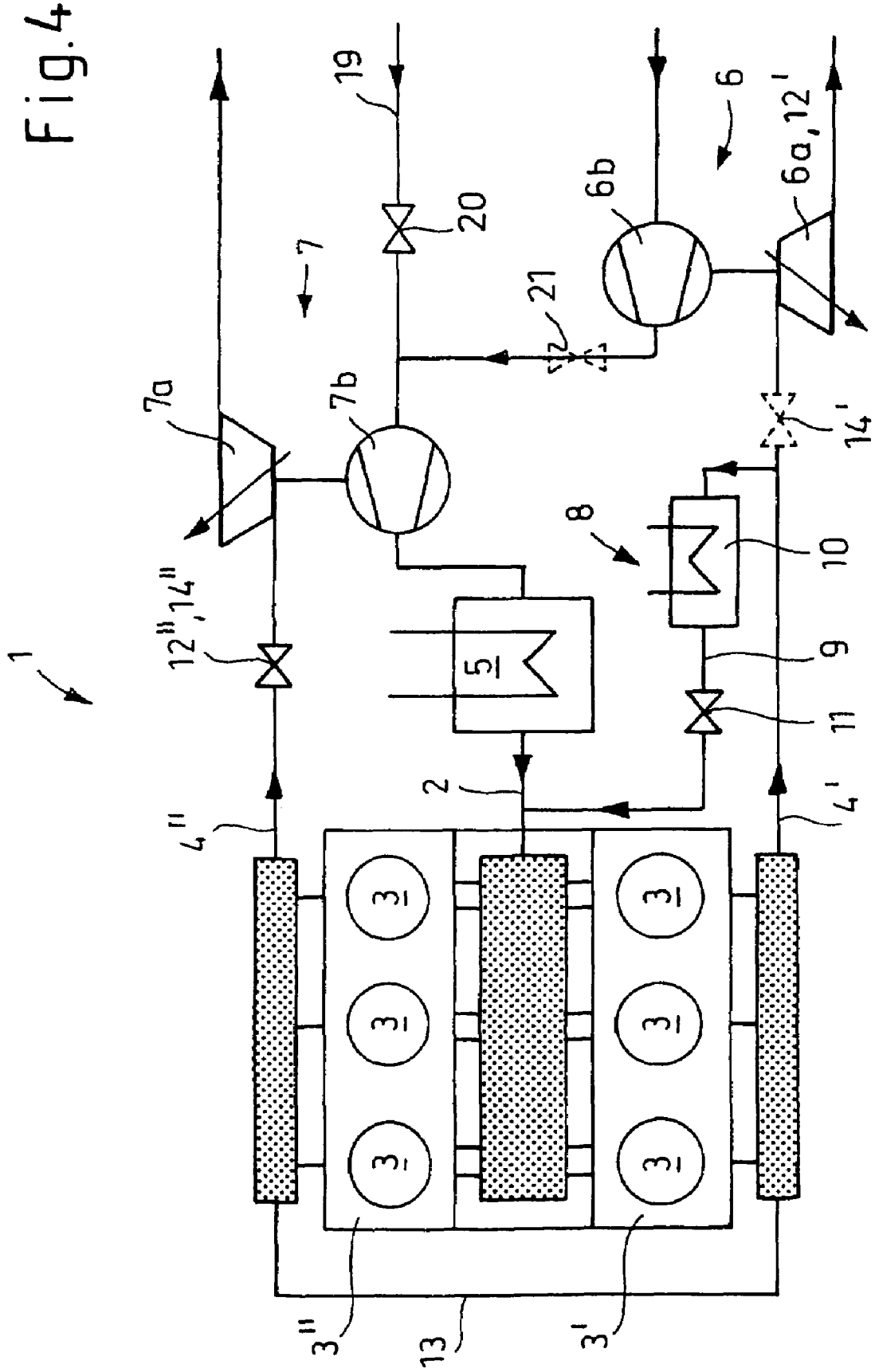
Figure 5:
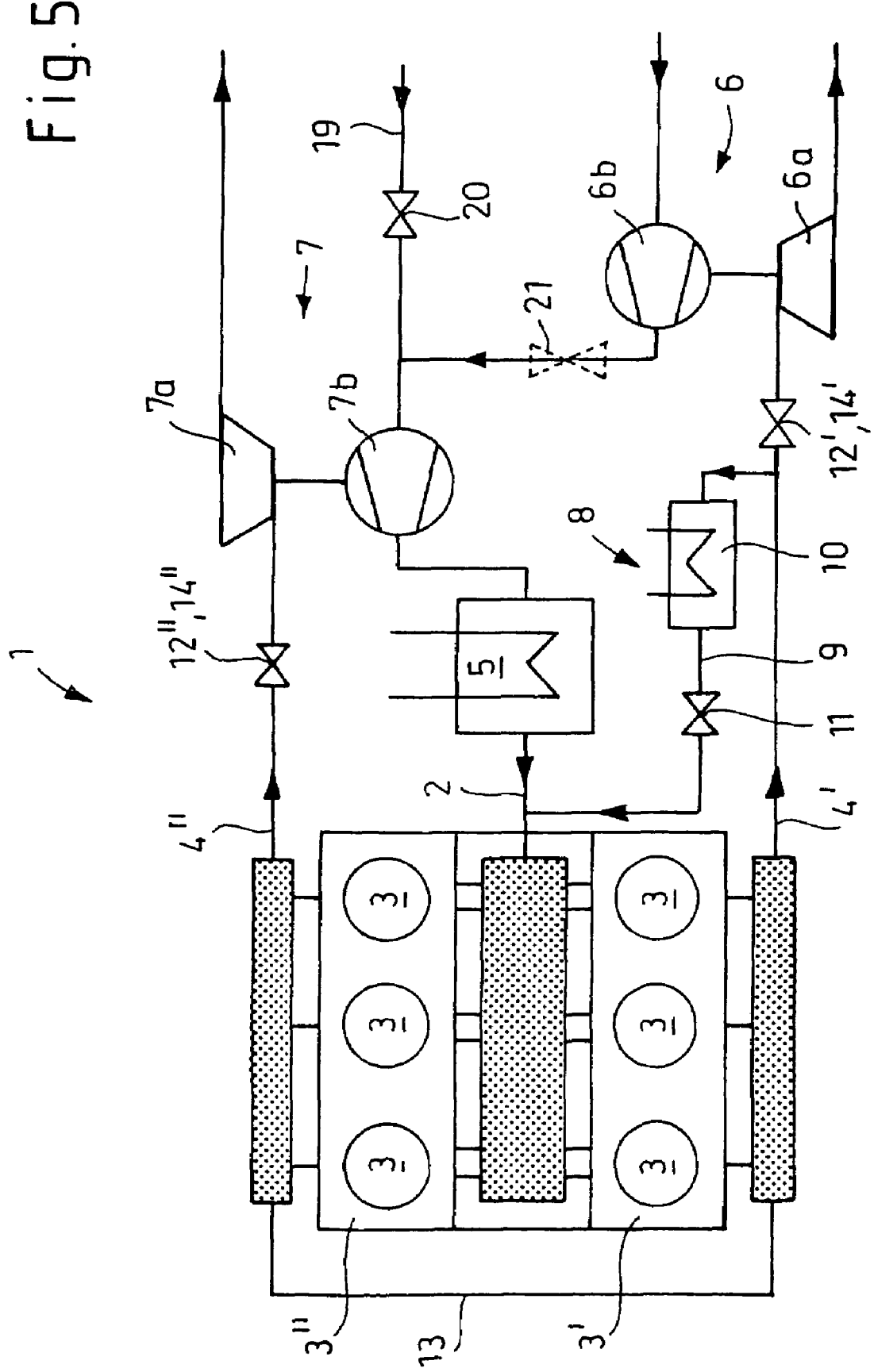
Figure 6:
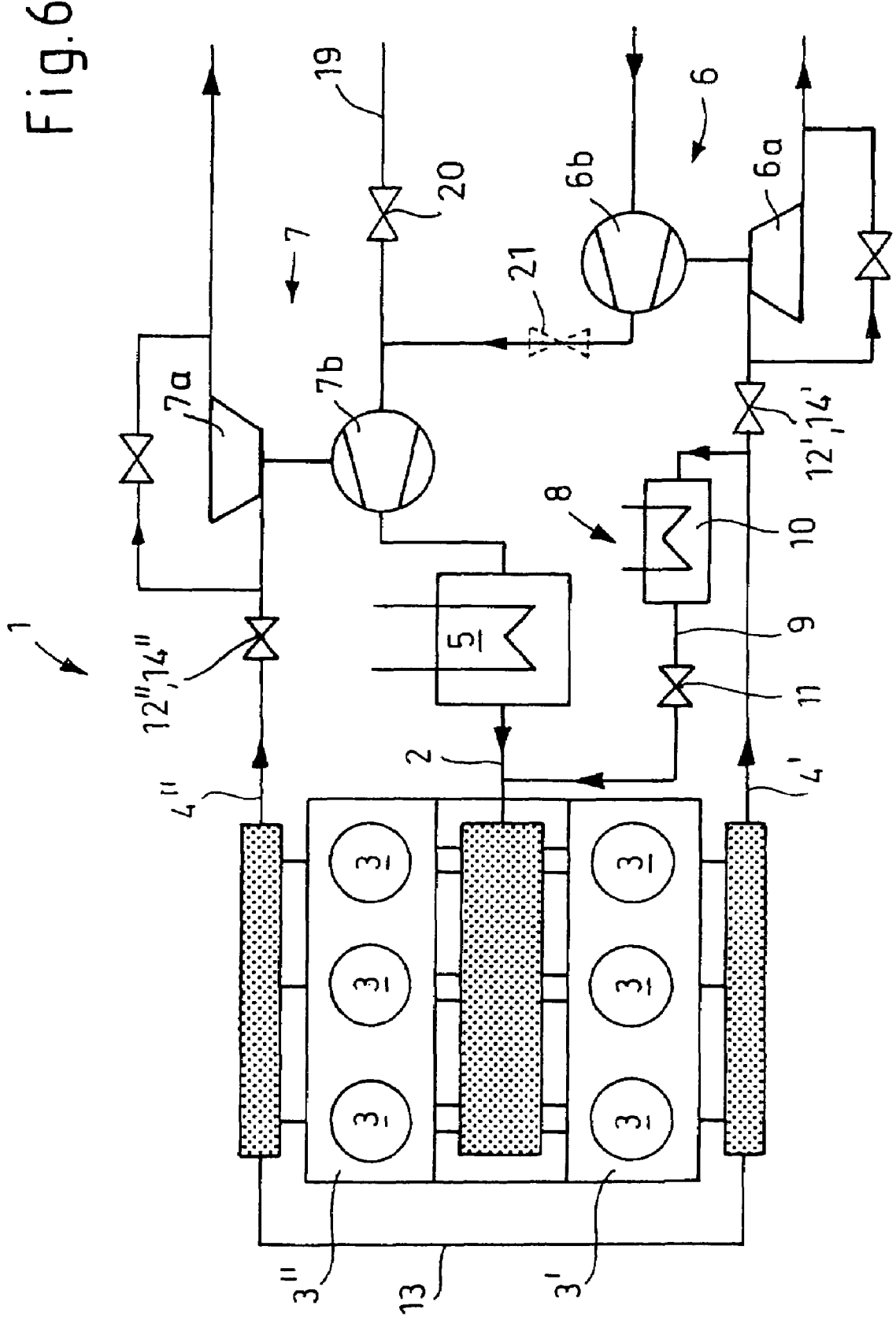
Figure 7:
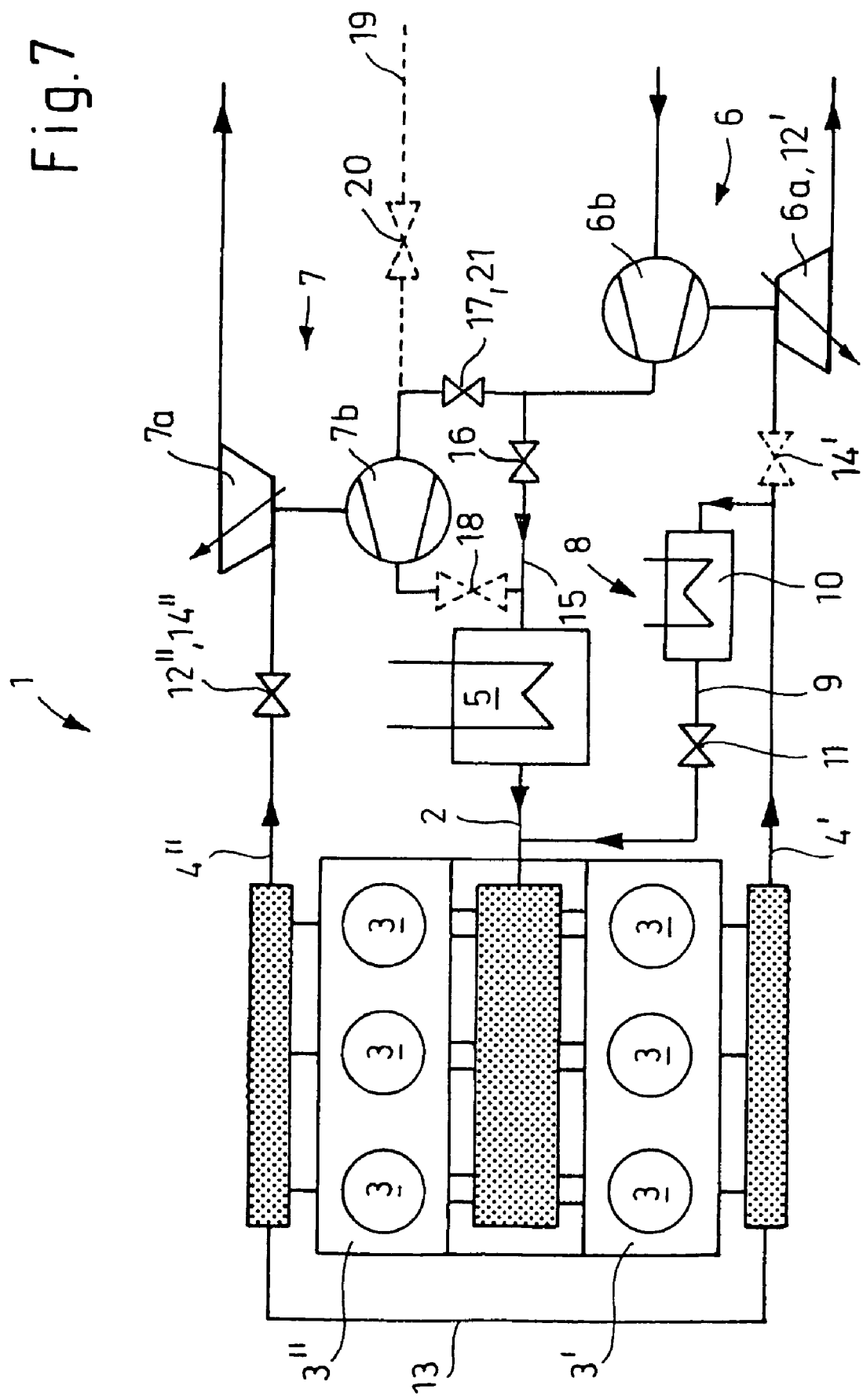
Figure 8:
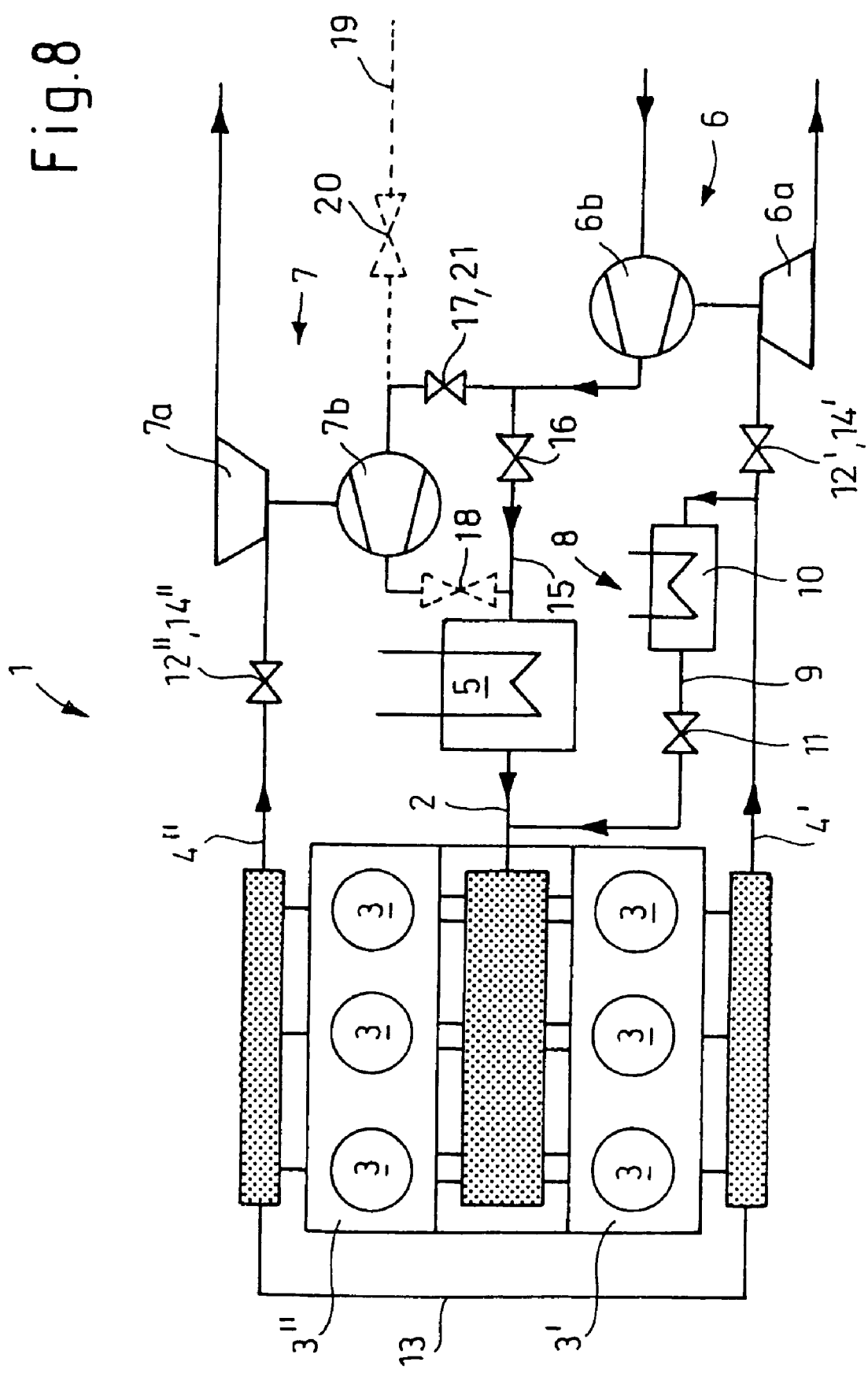
Figure 9:
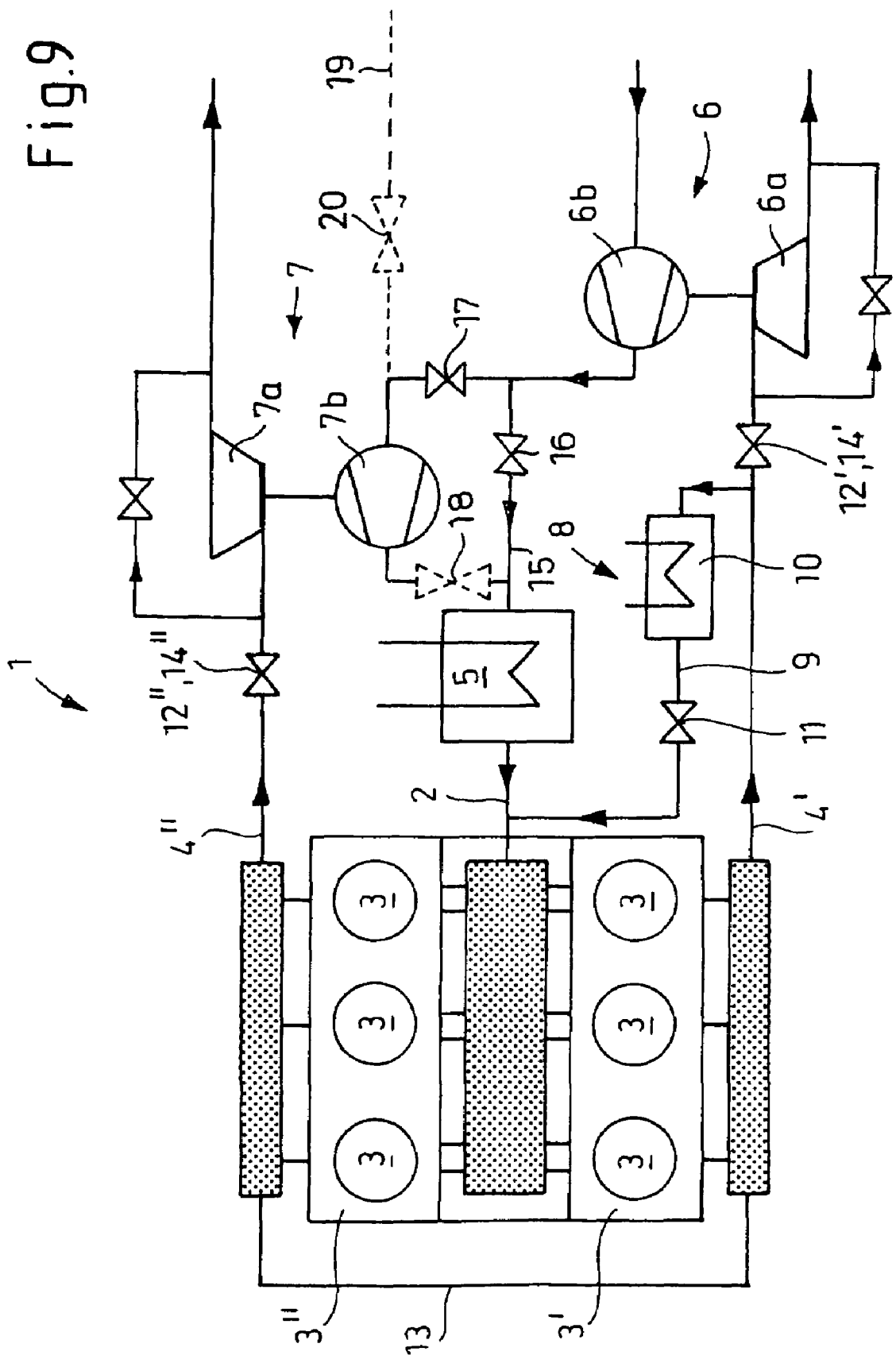

The first nine figures can be divided into three groups, with FIGS. 1, 4 and 7 forming the first group, FIGS. 2, 5 and 8 forming the second group and FIGS. 3, 6 and 9 forming the third group. The individual groups of figures are distinguished by the fact that the figures belonging to a group in each case build on one another as the figure number rises.

FIG. 1 shows a first embodiment of the supercharged internal combustion engine 1 on the basis of the example of a six-cylinder V engine. The cylinders 3 of the internal combustion engine 1 are divided into two cylinder groups 3', 3", which each have an exhaust pipe 4', 4", a connecting line 13 being provided, via which the two exhaust pipes 4', 4" are in communication with one another.

There are two exhaust gas turbochargers 6, 7, the first turbine 6a of the first exhaust gas turbocharger 6 being arranged in the first exhaust pipe 4' of the first cylinder group 3', and the second turbine 7a of the second exhaust gas turbocharger 7 being arranged in the second exhaust pipe 4" of the second cylinder group 3".

The compressors 6b, 7b assigned to these two turbines 6a, 7a are arranged in a common intake line 2, the second compressor 7b of the second exhaust gas turbocharger 7 being arranged downstream of the first compressor 6b of the first exhaust gas turbocharger. Consequently, the internal combustion engine 1 has two turbines 6a, 7a arranged or connected in parallel and two compressors 6b, 7b arranged or connected in series.

The first compressor 6b is designed to be larger than the second compressor 7b, since the first compressor 6b forms the low-pressure stage of the two-stage compression, whereas the second compressor 7b compresses the air which has already been precompressed, and therefore forms the high-pressure stage, which is to be of smaller design.

A charge-air cooler 5 is arranged downstream of the compressors 6b, 7b in the common intake line 2, which is used to supply the internal combustion engine 1 with fresh air or fresh mix. The charge-air cooler 5 lowers the air temperature and thereby increases the density of the air, so that it contributes to better filling of the cylinders 3 with air.

Moreover, the internal combustion engine 1 is equipped with an exhaust gas recirculation 8. For this purpose, a line 9 branches off from the first exhaust pipe 4' downstream of the first turbine 6a and opens out into the common intake line 2. The line 9 for exhaust gas recirculation 8 opens out into the common intake line 2 upstream of the charge-air cooler 5. In this way, the exhaust gas stream is no longer passed through the charge-air cooler 5 and cannot contaminate this cooler 5.

An additional cooler 10, which lowers the temperature of the hot exhaust gas stream, is provided in the line 9 for exhaust gas recirculation. A shut-off element 11 is likewise arranged in the first line 9, for controlling the exhaust gas recirculation rate.

In principle, the line 9 for exhaust gas recirculation 8 may also branch off from the second exhaust pipe 4" or at any desired location in the exhaust system, since the two exhaust pipes 4', 4" of the two cylinder groups 3', 3" are in communication with one another via the connecting line 13.

In the embodiment illustrated in FIG. 1, both the turbine 6a of the first exhaust gas turbocharger 6 and the turbine 7a of the second exhaust gas turbocharger 7 have a variable turbine geometry (VTG—clearly indicated by the arrow), allowing continuously variable adapting of the turbine geometry to the current operating point of the internal combustion engine 1 by adjusting the turbine blades. This in particular increases the quality and flexibility of the supercharging. The geometry of the turbine 6b, 7b can be adapted to the instantaneous exhaust gas mass flow by adjusting the rotor blades.

The compressors 6b, 7b may have a fixed geometry or may likewise be designed with a variable geometry. A variable geometry is advantageous if the corresponding turbine 6a, 7a has a variable turbine geometry and the compressor geometry is continuously matched to the turbine geometry.

A variable compressor geometry (VCG) has proven advantageous in particular at low exhaust gas mass flows through the turbine 6a, 7a and the associated low compressor mass flows, since by adjusting the blades it is possible to shift the pumping limit of the compressor 6b, 7b in the compressor characteristic diagram toward low compressor flows, thereby preventing the compressor 6b, 7b from operating beyond the pumping limit. In principle, the compressors 6a, 7a may also be equipped with a line for charge-air blow-off, but this has drawbacks for energy reasons.

According to the invention, means 12', 12" which can be used to control the two exhaust gas streams which are passed through the two turbines 6a, 7a are provided both in the first exhaust pipe 4' and in the second exhaust pipe 4".

In the embodiment illustrated in FIG. 1, the means 12" for controlling the exhaust gas mass flow in the second exhaust pipe 4" is a shut-off element 14". The shut-off element 14" can be used to alter the cross section of flow of the second exhaust pipe 4", with a reduction in the cross section of flow of the second exhaust pipe 4" leading to a reduction in the exhaust gas mass flow through the second turbine 7a.

The means 12' for controlling the exhaust gas mass flow in the first exhaust pipe 4' is formed by the first turbine 6a, which has a variable turbine geometry, a reduction in the exhaust gas mass flow passed through the first turbine 6a being achieved by adjustment of the turbine 6a or rotation of the blades of this turbine 6a in the direction of a reduction in the cross section. In this embodiment, the variable geometry is utilized to increase the flow resistance of the turbine 6a and to control the exhaust gas mass flow flowing through the first turbine 6a.

As an alternative or in addition, it is also possible for a shut-off element 14' to be provided in the first exhaust pipe 4', in order to influence or control the exhaust gas mass flow through the first turbine 6a, as indicated by a shut-off element 14' illustrated in dashed lines. In an alternative embodiment to the first embodiment of the internal combustion engine 1, it would also be possible to dispense with the shut-off element 14" in the second exhaust pipe 4" and for the exhaust gas mass flow through the second turbine 7a to be influenced or controlled by means of a variable turbine geometry.

On account of the fact that the two exhaust pipes 4', 4" are connected to one another, the entire exhaust gas stream can be passed both completely through the first turbine 6a and completely through the second turbine 7a. It is in principle also possible to divide the hot exhaust gases between the two turbines 6a, 7a, in particular asymmetrically, so that a larger exhaust gas stream can be fed to one turbine 6a, 7a and a smaller exhaust gas stream can be fed to the other turbine 6a, 7a.

At low engine speeds or with small quantities of exhaust gas, the means 12', 12" provided in the exhaust pipes 4', 4" are controlled in such a manner that the main part of the exhaust gas is passed through the second, smaller turbine 7a, which is designed for small exhaust gas streams. If, to generate high boost pressures in the lower and middle part-load ranges, the exhaust gas stream is passed substantially through the small turbine, this simultaneously ensures a sufficiently high exhaust gas back pressure in the exhaust pipes 4', 4", thereby ensuring that it is possible to realize high EGR rates.

At high engine speeds or with large quantities of exhaust gas, the means 12', 12" provided in the exhaust pipes 4', 4" are then controlled in such a way that the main part of the exhaust gas is passed through the first, larger turbine 7b, which is designed for large exhaust gas mass flows.

FIG. 2 diagrammatically depicts a second embodiment of the supercharged internal combustion engine 1. Only the differences from the embodiment illustrated in FIG. 1 will be explained, and consequently reference is otherwise made to FIG. 1. The same reference designations are used for the same components.

Unlike in the embodiment illustrated in FIG. 1, in the case of the internal combustion engine 1 illustrated in FIG. 2, a shut-off element 14' is provided in the first exhaust pipe 4' upstream of the first turbine 6a, in order to influence or control the exhaust gas mass flow through the first turbine 6a.

Moreover, the two turbines 6a, 7a are designed with a fixed, i.e. invariable turbine geometry. Unlike in the embodiment described above, in which both turbines are designed with a variable geometry (VTG), in this case in principle one control is dispensed with. Overall, this embodiment in particular has cost benefits.

FIG. 3 diagrammatically depicts a third embodiment of the supercharged internal combustion engine 1. Only the differences with respect to the embodiment illustrated in FIG. 2 will be explained, and consequently reference is otherwise made to FIG. 2. The same reference designations were used for the same components.

Unlike in the embodiment illustrated in FIG. 2, in the case of the internal combustion engine 1 illustrated in FIG. 3, both turbines 6a, 7a are designed as what are known as waste gate turbines. For exhaust gas blow-off purposes, the waste gate turbines 6a, 7a have a bypass line which bypasses the turbine 6a, 7a, which is a characteristic feature of this specific design of turbine. The turbine 6a, 7a is designed for small exhaust gas streams, which significantly improves the quality of the supercharging in the part-load range. As the exhaust gas stream increases, a larger proportion of the exhaust gas is made to bypass the turbine 6a, 7a via the bypass line. A shut-off element is provided in the bypass line for controlling the exhaust gas blow-off.

With regard to the design of an internal combustion engine 1 according to the invention, it is advantageous if the bypass lines of the waste gate turbines 6a, 7a branch off from the exhaust pipes 4', 4" downstream of the shut-off elements 14', 14" arranged in the exhaust pipes 4', 4", so that the exhaust gas stream which is passed through the turbine 6a, 7a or bypass line can actually be controlled by means of shut-off element 14', 14".

FIG. 4 diagrammatically depicts a fourth embodiment of the supercharged internal combustion engine 1. Only the differences with respect to the embodiment illustrated in FIG. 1 will be explained, and consequently reference is otherwise made to FIG. 1. The same reference designations have been used for the same components.

Unlike in the embodiment illustrated in FIG. 1, in the case of the internal combustion engine 1 illustrated in FIG. 4, the second compressor 7b can be connected to atmosphere by means of an additional line 19, in which a shut-off element 20 is provided.

This embodiment is advantageous in particular at low engine speeds or with small quantities of exhaust gas, when the main part of the exhaust gas is passed through the second, smaller turbine 7a. Under these operating conditions, the first, larger compressor 6b is scarcely operating or is not operating at all, and consequently the second compressor 7b has to deliver, i.e. to take in, the fresh air through the first compressor 6b, which is disadvantageous in energy terms. Moreover, when it is taking in the fresh air, the second compressor 7b draws oil out of the first compressor 6b, which is disadvantageous in particular with regard to pollutant emissions and can be avoided by opening the shut-off element 20 and taking in fresh air from atmosphere through the additional line 19.

In addition, a shut-off element 21 can be provided in the common intake line 2 between the two compressors 6b, 7b, in order to completely suppress the flow of fresh air through the first compressor 6b while the second compressor 7b is taking in fresh air from atmosphere via the additional line 19. This shut-off element 21 is indicated by dashed lines in FIG. 4.

FIGS. 5 and 6 build on FIGS. 2 and 3, respectively, in the same way as FIG. 4 builds on FIG. 1. The embodiments differ by virtue of the provision of an additional line 19, which enables the second compressor 7b to take in fresh air from atmosphere, a shut-off element 20 provided in this line 19, and a shut-off element 21 arranged in the common intake line 2 between the compressors 6b, 7b. For this reason, reference is made to the embodiment which has been described above in connection with FIG. 4. The same reference designations have been used for the same components.

FIG. 7 diagrammatically depicts a seventh embodiment of the supercharged internal combustion engine 1. Only the differences with respect to the embodiment illustrated in FIG. 1 will be explained, and consequently reference is otherwise made to FIG. 1. The same reference designations have been used for the same components.

Unlike in the embodiment illustrated in FIG. 1, in the case of the internal combustion engine 1 illustrated in FIG. 7, the second compressor 7b is equipped with a second bypass line 15, which branches off from the common intake line 2 downstream of the second compressor 7b and opens out into the common intake line 2 again downstream of the first compressor 6b and upstream of the second compressor 7b, a shut-off element 16 being provided in the second bypass line 15 in order to influence or control the fresh air mass flow flowing through this bypass line 15.

This embodiment of the internal combustion engine 1 according to the invention is advantageous in particular at high engine speeds or with large quantities of exhaust gas, when the main part of the exhaust gas is being passed through the first, larger turbine 7a. Under these operating conditions, the second, smaller compressor 6b is scarcely operating or is not operating at all, and consequently the first compressor 6b has to deliver the fresh air through the second compressor 7b, which is disadvantageous in energy terms, since the second compressor 7b represents a flow resistance to the fresh air compressed in the first compressor 6b on its way to the cylinders 3. This inevitably leads to a drop in the boost pressure generated by means of the first compressor 6b.

The supercharging can be optimized with the embodiment illustrated in FIG. 7 by virtue of the second bypass line 15 being opened up by opening the shut-off element 16 and the first compressor 6b using the second bypass line 15 to bypass the second compressor 7b.

In this case, fresh air can pass into the second compressor 7b. In general, although the fresh air flow takes the line with the lowest flow resistance, which when the shut-off element 16 is fully open is formed by the bypass line 15, to completely prevent flow through the second compressor 7b, a shut-off element 17 is provided in the common intake line 2 upstream of the second compressor 7b before the point where the second bypass line 15 opens out. As a result, the fresh air flow which comes out of the first compressor 6b is inevitably diverted into the bypass line 15 when the shut-off element 17 is closed.

Moreover, a shut-off element 18 is provided in the common intake line 2 downstream of the second compressor 7b before the point where the second bypass line 15 branches off. Closing this shut-off element 18 prevents the charge air from flowing back into the second compressor 7b.

The bypass line 15 which is additionally provided in the embodiment illustrated in FIG. 7, and the additional shut-off elements 16, 17, enable the two compressors 6b, 7b to be operated in parallel, making it possible to switch between two-stage supercharging and one-stage supercharging.

Furthermore, as in the embodiments shown in FIGS. 4, 5 and 6, it is possible to provide an additional line 19, which is indicated by dashed lines and via which the second compressor 7b can take in fresh air from the atmosphere.

FIGS. 8 and 9 diagrammatically depict an eighth and a ninth embodiment of the internal combustion engine 1. FIGS. 8 and 9 build on FIGS. 2 and 3, respectively, in the same way as FIG. 7 builds on FIG. 1. The embodiments differ by virtue of the provision of a bypass line 15, a shut-off element 16 provided in this bypass line 15, and the two shut-off elements 17, 18 arranged in the common intake line 2. For this reason, reference is made to the embodiment which has been described above in connection with FIG. 7. The same reference designations have been used for the same components.

Figure 10:
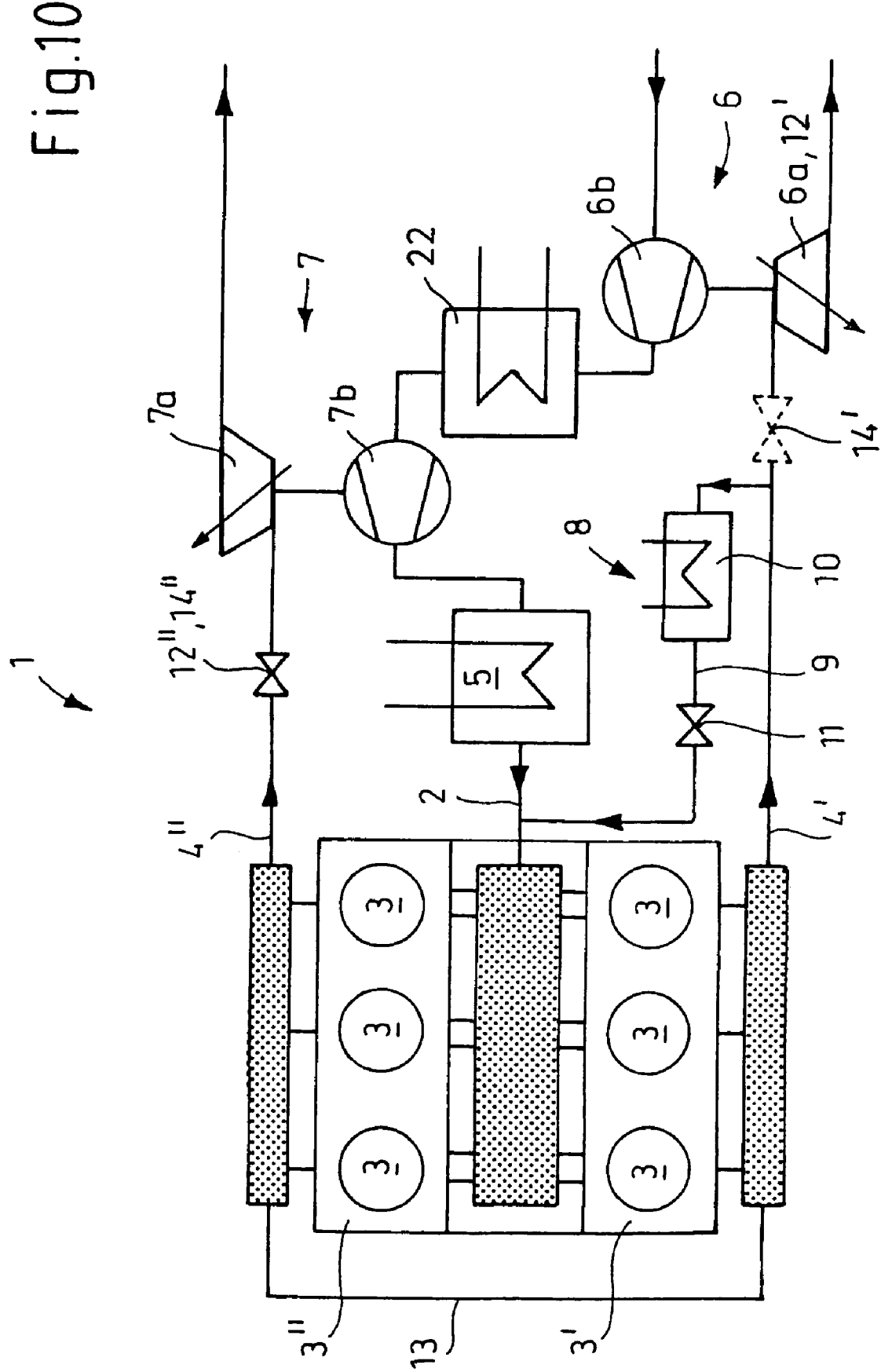

FIG. 10 diagrammatically depicts a tenth embodiment of the supercharged internal combustion engine 1. Only the differences from the embodiment illustrated in FIG. 1 will be explained, and consequently reference is otherwise made to FIG. 1. The same reference designations have been used for the same components.

Unlike in the embodiment illustrated in FIG. 1, in the case of the internal combustion engine 1 illustrated in FIG. 10, a second charge-air cooler 22 is arranged in the common intake line 2 between the compressors 6*b*, 7*b*. The combustion air which is precompressed in the first compressor 6*b* and is heated during the precompression is in this way cooled before it enters the second compressor 7*b*, which contributes to improved cylinder filling and therefore further improves the quality of the supercharging.

Intercooling 22 of the combustion air of this nature can likewise be provided in the embodiments shown in FIGS. 2 to 9.

This concludes the description of the invention. The reading of it by those skilled in the art would bring to mind many alterations and modifications without departing from the spirit and the scope of the invention. Accordingly, it is intended that the scope of the invention be defined by the following claims:

The invention claimed is:

1. A supercharged internal combustion engine having at least two cylinders, which are configured in such a way that they form two groups of in each case at least one cylinder, both cylinder groups in each case being equipped with an exhaust pipe, and the two exhaust pipes being in communication with one another, and having two exhaust gas turbochargers, turbines of the two exhaust gas turbochargers being connected in parallel by virtue of a first turbine of a first exhaust gas turbocharger being arranged for receiving exhaust gas in the exhaust pipe of the first cylinder group and a second turbine of a second exhaust gas turbocharger being arranged for receiving exhaust gas in the exhaust pipe of the second cylinder group, with their compressors connected in series, by virtue of a first compressor of the first exhaust gas turbocharger being arranged in a common intake line, which is used to supply the internal combustion engine with fresh air or fresh mix, and a second compressor of the second exhaust gas turbocharger being arranged downstream of the first compressor in this common intake line, and having an exhaust gas recirculation which comprises a line which upstream of one of the two turbines branches off from the exhaust pipe assigned to this turbine and opens out into the common intake line, an exhaust gas mass flow control valve disposed between the first one of the pair of cylinder groups and an input of the turbine of the first one of the pair of exhaust gas turbochargers; a by-pass control valve disposed between the atmosphere and an inlet to the compressor the second one of the pair of exhaust gas turbochargers.

2. The supercharged internal combustion engine as claimed in claim 1, wherein the first compressor is larger than the second compressor.

3. The supercharged internal combustion engine as claimed in claim 2, wherein the first turbine is larger than the second turbine.

4. A supercharged internal combustion engine comprising:
a pair of cylinder groups;
a pair of exhaust pipes, each one of the pair of exhaust pipes being coupled to a corresponding one of the pair of cylinder groups and interconnected through a connecting line;
a pair of exhaust gas turbochargers, each one of the exhaust gas turbocharged having a turbine and a compressor;
wherein the turbine of a first one of the pair of exhaust gas turbochargers is disposed downstream of the one of the pair of exhaust pipes coupled to a first one of the pair of cylinder groups and the turbine of a second one of the pair of exhaust gas turbochargers is disposed downstream of the one of the pair of exhaust pipes coupled to a second one of the pair of cylinder groups;
wherein the compressor of the first one of the pair of exhaust gas turbochargers is disposed serially with the compressor of the second one of the pair of exhaust gas turbochargers between an air inlet for the compressor of the first one of the pair of exhaust gas turbochargers and a common feed to the pair of cylinder groups;
an exhaust gas recirculation system having: an input coupled to the one of the pair of exhaust pipes coupled to the second one of the pair of cylinder groups; and an output coupled to the common feed to the pair of cylinder groups; and
an exhaust gas mass flow control valve disposed between the first one of the pair of cylinder groups and an input of the turbine of the first one of the pair of exhaust gas turbochargers;
a by-pass control valves disposed between the atmosphere and an inlet to the compressor the second one of the pair of exhaust gas turbochargers;
and wherein when the exhaust gas mass flow control valve is in a closed position, the by-pass control valve is in an open position.

5. The supercharged internal combustion engine as claimed in claim 4, wherein the compressor of the first one of the pair of exhaust gas turbochargers is larger than the compressor of the second one of the pair of exhaust gas turbochargers second compressor.

6. The supercharged internal combustion engine as claimed in claim 5, wherein the turbine of the first one of the pair of exhaust gas turbochargers is larger than the turbine of the second one of the pair of exhaust gas turbochargers.

\* \* \* \* \*